April 9, 1963
G. V. IRELAND
3,084,408
V-BELT CONNECTOR
Filed Dec. 21, 1961
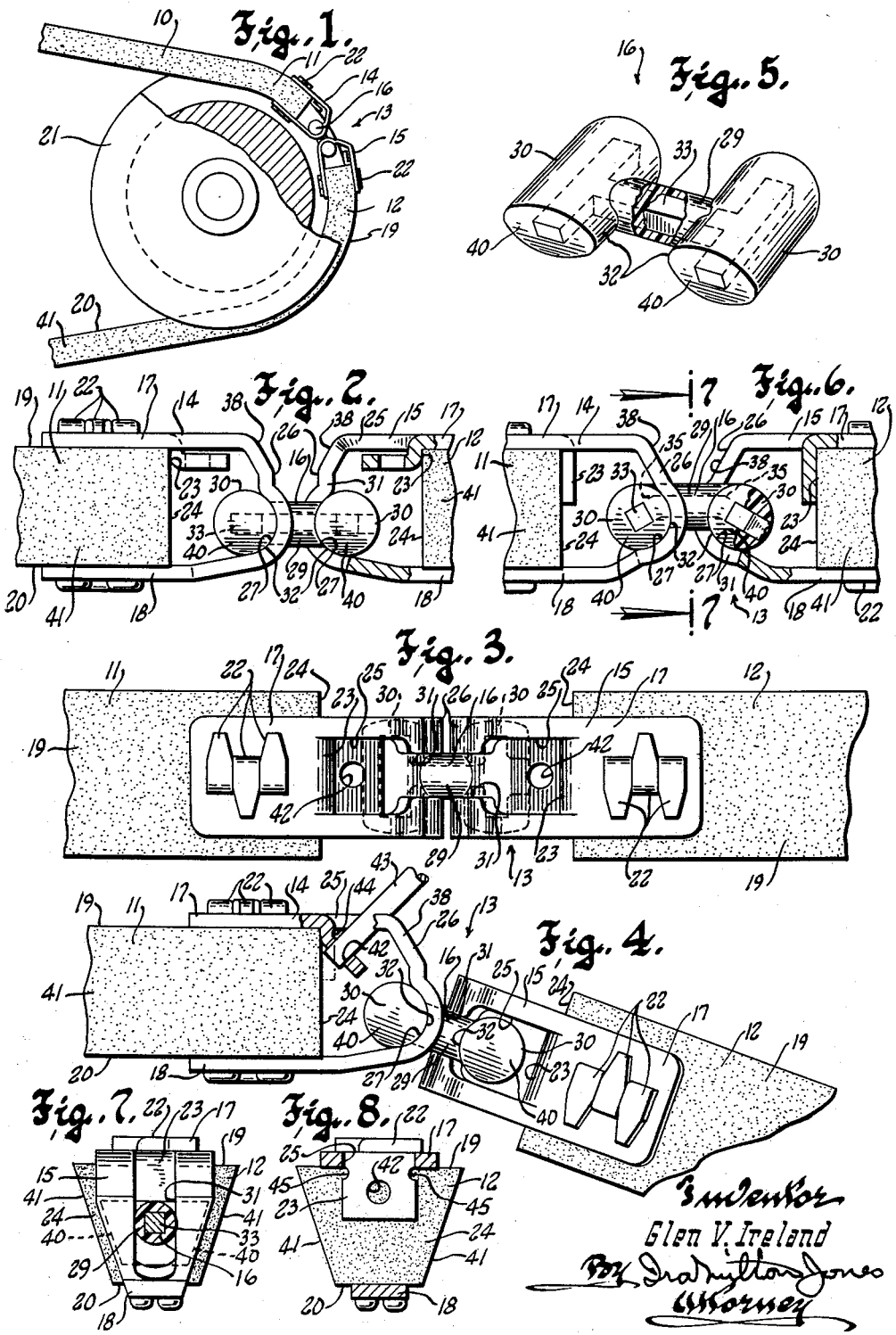
Inventor
Glen V. Ireland United States Patent Office 3,084,408
Patented Apr. 9, 1963

3,084,408
V-BELT CONNECTOR
Glen V. Ireland, Milwaukee, Wis., assignor of thirty percent to Ira Milton Jones, Milwaukee, Wis.
Filed Dec. 21, 1961, Ser. No. 161,166
18 Claims. (Cl. 24—33)

This invention relates to V-belt drives, and refers more particularly to detachable connectors for joining the opposite ends of a length of V-belting to form the same into an endless belt. This application is a continuation in part of my copending applications, Serial No. 87,009, filed February 3, 1961, now abandoned, and Serial No. 137,195, filed September 11, 1961, now abandoned.

V-belt connectors of the type to which this invention pertains not only make possible the use of V-belt drives in many cases where endless belts could not be installed previously, but also enable establishment and maintenance of belt drives in many types of machinery without the necessity for dismantling or disturbing the installation. In general, such V-belt fasteners or connectors comprise a bearing bracket or saddle permanently fixed to each end of a length of V-belting, and a link which detachably interconnects the bearing brackets or saddles and provides a double hinged joint therebetween by which the brackets may partake of relative hinging motion about each of two transverse axes intermediate the belt ends. Substantially unhampered hinging motion is of course very necessary when the belt, with the connector fastening its ends, passes over V-pulleys about which the belt is trained.

Despite their advantages, past V-belt fasteners of the type with which this invention is concerned were deficient for a number of reasons. Some had an excessive number of parts which were not only difficult to assemble and disassemble, but which, because of their small size, were easily lost during such assembly or disassembly. Others failed to provide for relative hinging motion of the saddles to the degree necessary for proper travel of the connectors around the smaller diameter pulleys. Still others did not retain the load stresses centered on the belt axis during travel of the connector around the peripheries of the pulleys, with the result that it was possible for the belt to slip out of the pulley grooves. Another serious disadvantage common to many proposed V-belt connectors was that high friction could develop at their hinged connections, consuming energy from the power source for the belt driven apparatus as well as causing wear which shortened the useful life of the connector.

With these objections to past V-belt connectors in mind, it is an object of this invention to provide an improved V-belt connector in which all of the above disadvantages are overcome, and which, in addition, features a minimum number of simple and easily produced parts, namely two bearing brackets or saddles which are secured to the belt ends and a unitary link hingedly but readily detachably connecting the saddles.

More specifically, this invention has as one of its objects to provide an improved V-belt connector of the character described wherein the unitary link by which the saddles are connected to one another has a dumbbell shape that promotes hinging motion of the saddles relative to the link and to one another, with the heads of the dumbbell providing opposing cylindrical surfaces that engage in cylindrically concave sockets in the saddles, and wherein the link heads are provided by a low friction bearing material such as nylon or the like, to insure that the belt drive will consume a minimum amount of power from the drive mechanism and to also insure a minimum of wear on the connector due to its hinging action.

Another specific object of this invention resides in the provision of a V-belt connector of the character described having a substantially dumbbell shaped link which is molded of nylon or similar plastic material that provides anti-friction bearing surfaces for the link, and has a reinforcing core comprising a simple sheet metal stamping molded into the link.

Another object of this invention resides in the provision of a V-belt connector of the character described, comprising a pair of saddles adapted to be conected to the ends of a length of V-belting and a dumbbell shaped link hingedly connecting the saddles, wherein the total length of the connector between the adjacent ends of a piece of V-belting connected thereby is relatively short, and wherein the hinging axes of the link and saddles are so disposed as to provide for very effective hinging action that allows the connector to pass around a pulley of substantially small diameter.

A further object of the present invention is to provide a V-belt connector of the character described wherein lugs are struck from the wider legs of its U-shaped saddles in such a way as to leave entrances therein through which the link heads may be passed when connecting the saddles together, and which lugs have the additional functions of affording stops that are engageable by the belt ends to assure proper positioning of the saddles thereon and to also provide means that are utilized to prevent accidental displacement of the link heads through said entrances after the link heads are engaged in the saddle sockets.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrates several complete examples of the physical embodiments of the invention constructed according to the best modes so far devised for the practical application of the principles thereof, and in which:

FIGURE 1 is a side elevational view of a length of V-belting having its opposite ends connected by a V-belt connector of this invention, showing the connector traveling around the periphery of a pulley about which the belt is trained, a portion of the pulley being broken away to more clearly show the connector;

FIGURE 2 is an enlarged side elevational view of the V-belt connector of this invention installed on the ends of a length of belting, portions of one of the saddles being broken away and shown in section;

FIGURE 3 is a top view of the connector shown in FIGURE 2;

FIGURE 4 is a view similar to FIGURE 3, but showing the parts of the connector in their relative positions in which assembly and disassembly of the link with one of the saddles can be accomplished;

FIGURE 5 is a perspective view of the link in the connector of this invention, with a portion broken away to show its core;

FIGURE 6 is a view similar to FIGURE 2, but showing a modified embodiment of the connector;

FIGURE 7 is a cross sectional view taken on the plane of the line 7—7 in FIGURE 6; and FIGURE 8 is a cross sectional view through the saddle of another modified embodiment of the connector of this invention.

Referring now to the accompanying drawings, in which like reference characters have been applied to like parts throughout the views, the numeral 10 generally designates a length of V-belting having opposite left and right end portions 11 and 12, respectively, separably joined together by a V-belt connector 13 of this invention.

The V-belt connector comprises a pair of opposite but identical bearing brackets or saddles 14 and 15, respectively, affixed to the left and right end portions of the belt, and a link 16 hingedly connecting the saddles. Each of the saddles is provided by a substantially U-shaped strap bent to form substantially flat outer and inner legs 17 and 18, respectively, between which an end portion of the V-belt is secured. The outer leg 17 of each saddle is wider than its inner leg 18 and overlies the wider outer face 19 of the belt end. The narrower inner leg 18 flatwise overlies the inenr face 20 of the belt end, and both of the legs are narrower than the respective faces of the belt which they overlie, so as to clear the converging side walls of a sheave or V-pulley 21 about which the belt may be trained.

Each of the saddles is permanently secured to one of the belt ends by means of nails or rivets 22, which, as is conventional, are received in aligned holes in the inner and outer legs of the saddle and are driven through the thickness of the belt. The heads of the nails may overlie the inner legs 18 of the saddle, while their extremities are bent over or riveted against the exposed surfaces of the wider outer legs 17 of the saddles.

Each of the saddles is formed with a stop lug 23 that is bent inwardly from the wider outer leg 17 of the saddle and provides a substantially wide shoulder or abutment that is normal to the outer leg and faces the free ends of the saddle legs. These lugs are engageable against the end surfaces 24 of the belting to properly locate each saddle thereon during its installation upon the belting, before and during riveting of its legs to the belt end. An important feature of this invention resides in the fact that the lugs 23 are of a size such that when struck downwardly from the outer saddle legs 17, entrance apertures 25 are formed in the outer legs which provide for interconnection of the link 16 with the saddles.

The bight portions 26 of the saddles, from which the legs 17 and 18 extend, are of course spaced outwardly from the adjacent end surfaces 24 of the belting when the saddles are installed on the belting, and have their concave surfaces facing the belt ends and their convex surfaces facing one another. The bight portion of each saddle includes a socket portion 27 which is spaced from both legs of the saddle and which has a cylindrical concave surface, the axis of which is transverse with respect to the belt end, and which axis is substantially intersected by the neutral or central axis of the V-belt.

The two saddles are hingedly connected by the rigid link 16, which is substantially dumbbell shaped, having a stem 29 and heads 30 at opposite ends of the stem that are engageable in the socket portions of the saddles. Each saddle has a slot 31 in its bight portion that extends from one of its legs to the other, and through which the stem of the link extends when a head 30 of the link is seated in the socket portion 27 of the saddle. The slots 31 open into the entrance apertures 25 in the outer legs, and accommodate the stem of the link to provide for a substantial range of swinging motion of the link relative to both saddles.

Each head on the link has a cylindrical surface 32, the radius of which is equal to the radius of the concave cylindrical surface of the socket portion 27 of the saddle, and the cylindrical surfaces on the link heads and saddles are thus adapted to cooperate in providing good bearing connections for swinging or hinging action of each saddle relative to the link. To insure that the bearings just described will have adequate surface area, the socket portion 27 of each saddle should embrace about one-third of the circumference of the link head. To further insure good bearing action, the cylindrical heads of the links are molded of nylon or a similar moldable plastic material which has very low friction characteristics and good wearing qualities, and the stem 29 of the link may be molded integrally with the heads.

In the present instance the link comprises an H-shaped core 33 which may be readily stamped from sheet metal. To provide for mounting the core in a mold, it can have a readily frangible tab extending from one of its head portions in a direction away from the stem. Surrounding and molded onto the core is the nylon encasement which provides the substantially cylindrical heads 30 of the link and builds out its stem to a cylindrical conformation. After the nylon link is molded the frangible tab is of course broken off of its core. Preferably the core is carburized before the link is molded, to improve its strength.

Attention is directed to the fact that the stem 29 of the link, which has a diameter substantially smaller than that of the cylindrical heads 30, may be disposed eccentrically to the axes of the cylindrical heads, as illustrated in FIGURE 6, or can have its axis coplanar with the axes of the heads, as shown in FIGURES 2, 4 and 5. The eccentric disposition of the stem axis in the version illustrated in FIGURE 6 is afforded by the fact that the stem portion of the core 33 has bends 35 near the heads so that the heads and the stem are tangent to a common plane at their outer sides.

In the event the stem is eccentrically disposed and the link assembled to the saddles with its stem closer to the wider outer legs of the saddles, the latter will be permitted maximum hinging motion in directions to bring their narrower inner legs 18 toward one another.

From FIGURES 2 and 3 it will be apparent that the striking of the shoulder lug 23 out of the outer leg 17 of the saddle leaves an aperture 25 in said leg which communicates with the outer end portion of the slot 31 in the bight portion and which is large enough to clear the head 30 of the link when the same is passed axially therethrough. To enable the link head to be passed through the entrance aperture 25 in this manner it is necessary to effect relative rotation between the saddle and the link about the axis of the link stem 29, to dispose the axis of the link head substantially perpendicular to that of the cylindrical surface of the socket portion 27 of the saddle, as illustrated in FIGURE 4. When the link heads are in place in their respective saddle sockets, such relative rotation is normally precluded as long as there is tension on the belt, due to the fact that the sockets are at the deepest portions of the saddle bights.

If the lugs 23 are left in their positions seen in FIGURE 6 after connection of the saddles by the link, the link may be disengaged from the sockets and removed from the saddles by passage of its heads outwardly through the entrance aperture 25 in the wider legs of the saddles. This, of course, also entails rotation of the link about the axis of its stem, relative to each saddle. In the present case, the link normally holds the saddles with their bight portions contiguous, and there is insufficient space between them to enable either head of the link to be backed out of its socket and then rotated to bring it into endwise alignment with the entrance apertures 25.

The disengagement of either saddle from the link can be most easily effected by first disposing the saddles in an angular relationship opposite that seen in FIGURE 1, and for that purpose the portions of the saddle bights outwardly of their sockets are rearwardly offset as at 38, away from the rearwardly facing surfaces of the socket 27, and rise abruptly toward their junctions with the outer legs of the saddles.

To enable the head of the link to readily clear the inner portions of the saddle as the link is rotated relative to the saddle, the end surfaces 40 of the heads of the link are inwardly convergent, as best seen in FIGURES 5 and 7, being disposed at oblique angles to the axes of the link heads, which angles substantially correspond to the angles of convergence of the side surfaces 41 of the belt. As a result of this inclination of the end surfaces of the head, it will be seen that as the saddle is rotated relative to the link, the end of the link head which approaches the inner leg 18 of the saddle can readily clear the same, despite the relatively short distance between the inner saddle leg and the socket portion 27. Similarly, when the head of the link is inserted into the saddle through the aperture 25, the inner leg 18 of the saddle does not interfere with translatory motion of the link to a position in which the axis of its stem substantially intersects the axis of the cylindrical surface of the socket 27, and the straight section 38 of the bight allows the head to be located close to the socket 27.

It will be observed that rotation of the saddle relative to the link, to the position of the saddle 15 in FIGURE 4, tends to cam the head of the link out of the socket 27 and thus disposes the link head in a position where it can be readily passed through the aperture 25.

It is a major feature of this invention that the stop lug 23 can be utilized to positively prevent accidental disengagement of the link heads from the saddles. As seen best in FIGURES 3 and 4, each lug 23 has a hole 42 therein, into which the end of a tool 43 can be engaged when the tool is passed through the slot 31 in the saddle. By exerting upward force upon the tool, the lugs are readily bent upwardly toward the entrance aperture 25, to any position that will so restrict the aperture as to preclude passage of the head of the link outwardly therethrough. To facilitate such bending the lug is suitably weakened along a transverse line spaced a short distance inwardly of the wide outer leg, as by means of a crease 44 (see FIGURE 4). Alternatively, weakening of the lug along such line can be effected by notching the side edges of the lug as at 45 (see FIGURE 8) just below the surface of the outer leg, or by otherwise abruptly reducing the width of the lug just below its junction with the outer leg.

If desired, the lug can be bent at an angle which disposes its free end in close proximity to the adjacent head of the link to limit motion thereof out of its socket. As shown, however, the lug can be swung upwardly to flatwise underlie the aperture 25 and substantially close it, and such bending of the lugs, of course, is facilitated by the weakening in each. Since the weakening in such lug defines the bend line of the lug and locates that bend line at a slight distance beneath the plane of the upper leg of the saddle, there will always be a root portion of each lug which remains engaged with the adjacent belt end to enhance the stability of the saddle thereon.

From the foregoing description, taken together with the accompanying drawing, it will be readily apparent that this invention provides a V-belt connector consisting of a minimum number of parts and having unusually good hinge bearings between its connected elements, but which connector nevertheless features ease of assembly and positive assurance against accidental disassembly of said elements.

What is claimed as my invention is:

1. A link for a belt connector of the type comprising a pair of U-shaped saddles having inner and outer legs engageable with the inner and outer surfaces of a length of belting, each saddle having a socket in its bight portion facing the free ends of its legs and having a slot extending around its bight portion, and said link being characterized by:
    (A) parallel cylindrical heads of long wearing anti-friction "nylon" material adapted to be rotatively received in the sockets of a belt connector so that the exteriors of the heads provide low friction bearing surfaces;
    (B) a metal reinforcing core axially embedded in each head and onto which cores the heads are rigidly and non-rotatably fixed; and
    (C) a stem extending lengthwise between and rigidly joining the medial portions of the heads,
        (1) said stem being adapted to extend loosely through the slots in the bight portions of a belt connector and
        (2) comprising an elongated metal member having its opposite end portions passing through the walls of the "nylon" heads and rigidly joined to the cores therein.

2. The link of claim 1 further characterized by the fact that the stem member has its end portions bent to one side to dispose the axes of the heads to said one side of the axis of the stem.

3. The link of claim 1, further characterized by: an encasement of "nylon" material fixed onto said elongated metal member and integral with the "nylon" material of the heads.

4. A link for a V-belt connector of the type comprising a pair of U-shaped saddles having inner and outer legs engageable with the inner and outer surfaces of a length of V-belting, each saddle having a socket in its bight portion facing the free ends of its legs and having a slot extending around its bight portion, said link being characterized by:
    (A) an elongated metal stem member adapted to extend through the slots in the bight portions of a V-belt connector;
    (B) cylindrical heads of long wearing anti-friction "nylon" material nonrotatably fixed with respect to the end portions of the stem member and parallel to one another, said heads being adapted to rotatively seat in the socket of a V-belt connector so that the exteriors of the heads provide low friction bearing surfaces; and
    (C) a metal reinforcing member for each head rigidly joined to each end of the stem member, extending lengthwise of the heads between the ends thereof and having the heads rigidly and nonrotatably secured thereto.

5. The link of claim 4, wherein said metal members are integral parts of an H-shaped sheet metal stamping, and further characterized by: an encasement of "nylon" material fixed on said stem member and integral with the "nylon" material of the heads.

6. A connector for detachably joining the ends of a length of V-belting, of the type comprising a pair of U-shaped saddles, each having inner and outer legs engageable over the inner and outer faces of one end portion of a length of V-belting and each having a slot in its bight portion which extends from one of its legs toward the other, and a substantially H-shaped link adapted to have its head portions engaged in the bight portions of the saddles and its stem portion extending through said slots in the saddles, characterized by:
    (A) a lug on each of said saddles integral with and struck inwardly from the outer leg of the saddle to provide an abutment flatwise engageable with an end surface of a piece of belting to which the saddle is securable, whereby the location of the saddle on the end portion of the belting is accurately defined during securement of the saddle thereto;
    (B) there being an aperture in the outer leg of each saddle, wider than and opening to said slot, and which is defined by the formation of said lug out of the body of the outer leg and through which aperture one of the heads of the link can pass to allow the link head to be engaged in the bight portion of the saddle; and
    (C) therebeing a hole in said lug into which the end of a tool inserted through the slot in the saddle may be engaged to enable a free end portion of said lug to be bent up, by force exerted on the tool, to a position at least partially blocking said aperture and assuring against accidental displacement of the link head from the saddle.

7. The connector of claim 6, further characterized by the fact that said lug is weakened along a line extending transversely across the lug at a location spaced inwardly from said outer leg of the saddle and parallel to the surface of said outer leg to define the bend line about which the lug can be bent toward its aperture blocking position, and to facilitate bending of the lug by a tool having its end engaged in the hole in the lug.

8. A link for a belt connector of the type comprising a pair of U-shaped saddles having inner and outer legs engageable with the inner and outer surfaces of a length of belting and bight portions which provide concave sockets that face away from one another when the ends of the belting are connected, said link comprising:
 (A) a stamped substantially H-shaped core of sheet metal providing a pair of heads connected by a stem; and
 (B) encasements on the core, of plastic material having good anti-friction and long wearing qualities, embracing and nonrotatably fixed to the opposing portions of the heads of the core, the exteriors of said encasements providing opposing and parallel cylindrical bearing surfaces which are adapted to seat and rotate in the sockets of the saddles.

9. The link of claim 8, further characterized by an encasement fixed to the stem of said core, which is integral with the encasements of the core heads.

10. In a connector for detachably joining the ends of a length of V-belting, of the type comprising a substantially H-shaped link having transverse heads at opposite ends of a stem:
 (A) a pair of U-shaped saddles
  (1) each having inner and outer legs engageable over the inner and outer surfaces of an end portion of a length of V-belting so that when the ends of the belt are connected the bight ends of the saddles are contiguous to and closely oppose one another,
  (2) the bight of each saddle having a portion offset away from the free ends of its legs to provide a transverse cylindrical socket in which a head of the link is receivable, and
  (3) each saddle having a slot in its bight that extends toward the legs and through which slot the stem of the link loosely passes;
 (B) the heads of the link being fixed against rotation relative to the stem and comprise of long wearing anti-friction plastic material and providing opposing cylindrical bearings that rotatably engage in said sockets and are parallel to one another and normal to the stem axis;
 (C) the outer leg of each saddle having an aperture therein wider than and opening to said slot and which is large enough to allow a head of the link to pass endwise therethrough to provide for assembly of the link with the saddle;
 (D) and a lug on the outer leg of each saddle struck inwardly therefrom to define said aperture therein, said lug being bent outwardly to underlie and block said aperture so as to prevent accidental disengagement of the link head from the saddle.

11. A connector for detachably joining the ends of a length of V-belting, of the type comprising a pair of U-shaped saddles, each having inner and outer legs engageable over the inner and outer faces of one end portion of a length of V-belting and each having a slot in its bight portion which extends from one of its legs toward the outer, and a substantially H-shaped link having its head portions engaged in the bight portions of the saddles and its stem portion extending through said slots in the saddles, characterized by:
 (A) a lug on each of said saddles integral with and struck inwardly from the outer leg of the saddle to provide
  (1) an abutment engageable with an end surface of a piece of belting to which the saddle is securable, whereby the location of the saddle on the end portion of the belting is accurately defined during securement of the saddle thereto, and
  (2) to provide an aperture in the outer leg of the saddle, wider than but communicating with said slot, which is defined by the formation of said lug out of the body of the outer leg and through which aperture one of the heads of the link can pass to allow the link head to be engaged in the bight portion of the saddle; and
 (B) further characterized by the fact that said lug is weakened along a line extending transversely across it and spaced inwardly from the outer leg to define a bend line about which the lug can be bent outwardly toward a position in which it substantially blocks said aperture and assures against accidental displacement of the link head from the saddle.

12. A connector for joining the ends of a length of belting, including a pair of substantially U-shaped metal saddles each having a bight portion and spaced apart legs which oppose one another and project in one direction from the bight portion, said legs being adapted to lengthwise embrace an end portion of a length of belting and to provide for securement of the saddle thereto with its bight portion spaced from the end surface of the belting, the bight portion of each saddle providing a transversely extending concave socket facing in said one direction, and having a slot therein that extends around the bight portion, and a link hingedly connecting said saddles with their bight portions in closely opposed relation, said link being substantially H-shaped to provide a stem that loosely projects through the slots in the bight portions of the saddles and transverse heads on the ends of the stem that are received in the saddle sockets, said connector being characterized by the following:
 (A) the link has heads with convex front surfaces that oppose one another and rotatively engage the concave surfaces of the saddle sockets, one of the heads having a girth to preclude its passage through the slot in the bight of its saddle and a length which is less than the distance between the legs of its saddle;
 (B) one leg of said saddle has an entrance opening wider than and communicating with the slot therein, which opening is of a size and shape to enable said head to be passed lengthwise therethrough;
 (C) said one leg of said saddle has a lug struck inwardly therefrom and providing an abutment that is engageable with an end surface of a length of belting to which the saddle is securable to accurately space the socket of the saddle from the end of the belting;
 (D) Said lug comprises metal of said one saddle leg displaced therefrom in the formation of a portion of said entrance opening;
 (E) and said lug being of a length such that the sum of its length and the thickness of said link head measured from front to back thereof is greater than the dimension of said entrance opening measured perpendicularly to the bend line about which the lug is struck.

13. The connector of claim 12, wherein said lug has an outer portion bent outwardly toward said one leg of the saddle and occupying a position blocking the entrance opening therein to prevent accidental displacement of the head of the link from the saddle.

14. In a connector for joining the ends of a length of belting:
 (A) a pair of substantially U-shaped metal saddles each having (1) spaced top and bottom legs which provide for securement of the saddle to the end portion of a length of belting, and
(2) a bight joining the forward ends of the saddle legs and having
   (a) a slot therein extending around the bight and toward the legs,
   (b) an intermediate portion defining a socket that extends across the bight on a transverse axis spaced from the top leg, and which socket has a bottom surface that faces rearwardly toward the free ends of the legs, and
   (c) an upper bight portion which rises from said socket and is offset a distance rearwardly of said bottom surface of the socket;
(B) an H-shaped link hingedly connecting the saddles, said link having
   (1) transverse heads received in the sockets, with convex front surfaces that face one another and engage the concave surfaces of the sockets, the heads having a girth to preclude their passage through said slots, and a length which is less than the distance between the saddle legs,
   (2) and a stem connecting the heads and loosely projecting through said slots, the stem having a length such as to hold the saddles with their bights opposed and with not more than a predetermined small clearance space between their socket defining portions, and which clearance space is less than the depth of either socket, so that there is a predetermined larger clearance space between said rearwardly offset upper portions of the bight;
(C) and means providing for assembly of each head of the link into the socket of its saddle, comprising an entrance opening in the top leg of the saddle which communicates with the slot thereof and has a size and shape to prevent all but lengthwise passage of the head of the link therethrough, so that disconnection of either saddle from the link head in its socket entails relative rotation of the saddle and link about the axis of the link stem to a position at which the link head aligns lengthwise with the entrance opening in the saddle, the engagement of the link heads in their sockets blocking such relative rotation of the saddles and link in all positions the saddles are caused to assume in normal use on a length of belting, but the link heads being displaceable from their sockets when the saddles are relatively manually moved to abnormal positions at which said rearwardly offset upper portion of the bight of one of the saddles is spaced no farther from a bight portion of the other saddle than said predetermined small clearance space.

15. The connector of claim 14, wherein the top legs of the saddles are wider than the bottom legs thereof, and wherein the end surfaces on both heads of the H-shaped link lie within and are parallel to converging planes that are inclined obliquely to the axis of the heads, and each of which planes contains a longitudinal edge of one of the wider legs of a saddle and the adjacent longitudinal edge of the narrower leg of the saddle.

16. The connector of claim 14, further characterized by:
(A) a lug integral with and struck downwardly from the top leg of each saddle, said lug having
   (1) a portion adjoining said leg defining a stop that is enageable with the end surface of a length of belting to which the saddle may be secured to accurately space the socket of the saddle from said end surface of the belting, and
   (2) having a free end portion that is bent upwardly toward said top leg and is disposed to block the entrance opening therein so as to prevent accidental detachment of the head of the link from the saddle.

17. The connector of claim 16, further characterized by the fact that the lug on each saddle is weakened along a line spaced inwardly from said top leg of the saddle and extending across the lug parallel to the surface of said leg, to enable the free end portion of the lug to be readily bent upwardly to said position in which it blocks said entrance opening.

18. In a connector for joining the ends of a length of belting:
(A) a pair of substantially U-shaped metal saddles each having
   (1) spaced top and bottom legs which provide for securement of the saddle to the end portion of a length of belting, and
   (2) a bight joining the forward ends of the saddle legs and having
      (a) a slot therein extending around the bight and toward the legs,
      (b) an intermediate portion defining a socket that extends across the bight on a transverse axis spaced from the top saddle leg, and which socket has a concave bottom surface that faces rearwardly toward the free ends of the legs,
      (c) and an upper bight portion which connects the socket portion with the forward end of the top saddle leg, rises from the socket portion, and is offset a distance rearwardly from said bottom surface of the socket;
(B) an H-shaped link hingedly connecting the saddles, said link having
   (1) transverse heads received in the sockets, with convex front surfaces that face one another and engage the concave surfaces of the sockets, one of the heads having a length less than the distance between the legs of its saddle and a girth to preclude its passage through the slot in the bight of its saddle,
   (2) and a stem connecting the heads and loosely projecting through said slots, the stem having a length such as to hold the saddles with their socket defining portions closely opposed and with not more than a predetermined small clearance space between them, which clearance space is less than the depth of either socket so as to prevent displacement of either head from its socket in all relative positions the saddles may assume during normal use of the connector on a length of belting, and so that there is a predetermined larger clearance space between said rearwardly offset upper portions of the bights, which larger clearance space is greater than the depth of either socket;
(C) and means providing for disassembly of said one head of the link from the socket of its saddle, comprising an entrance opening in said forward portion of the top saddle leg, larger than and communicating with the slot in the bight of the saddle, and of a size and shape to prevent all but endwise passage of said head of the link therethrough, so that disconnection of said one link head from the socket of its saddle entails relative rotation of the saddle and link substantially about the axis of the link stem while the saddles are held in abnormal positions never encountered in normal use of the connector on a length of belting, and at which abnormal positions the rearwardly offset upper bight portion of one of the saddles opposes and is spaced substantially no farther from a bight portion of the other saddle than said predetermined small clearance space to allow said one head to be disengaged from its socket and then turned substantially about the axis of the link stem to bring one end of said head into the entrance opening.

References Cited in the file of this patent

UNITED STATES PATENTS

| | | |
|---|---|---|
| 2,816,453 | Frank et al. | Dec. 17, 1957 |

FOREIGN PATENTS

| | | |
|---|---|---|
| 627,723 | France | June 14, 1927 |
| 24,405 | Great Britain | 1910 |
| 24,876 | Great Britain | 1908 |
| 25,952 | Great Britain | 1911 |
| 517,244 | Great Britain | Jan. 24, 1940 |